Oct. 30, 1928.
B. BURTON
EDUCATIONAL APPLIANCE
Filed Oct. 29, 1926
1,689,422
2 Sheets-Sheet 1
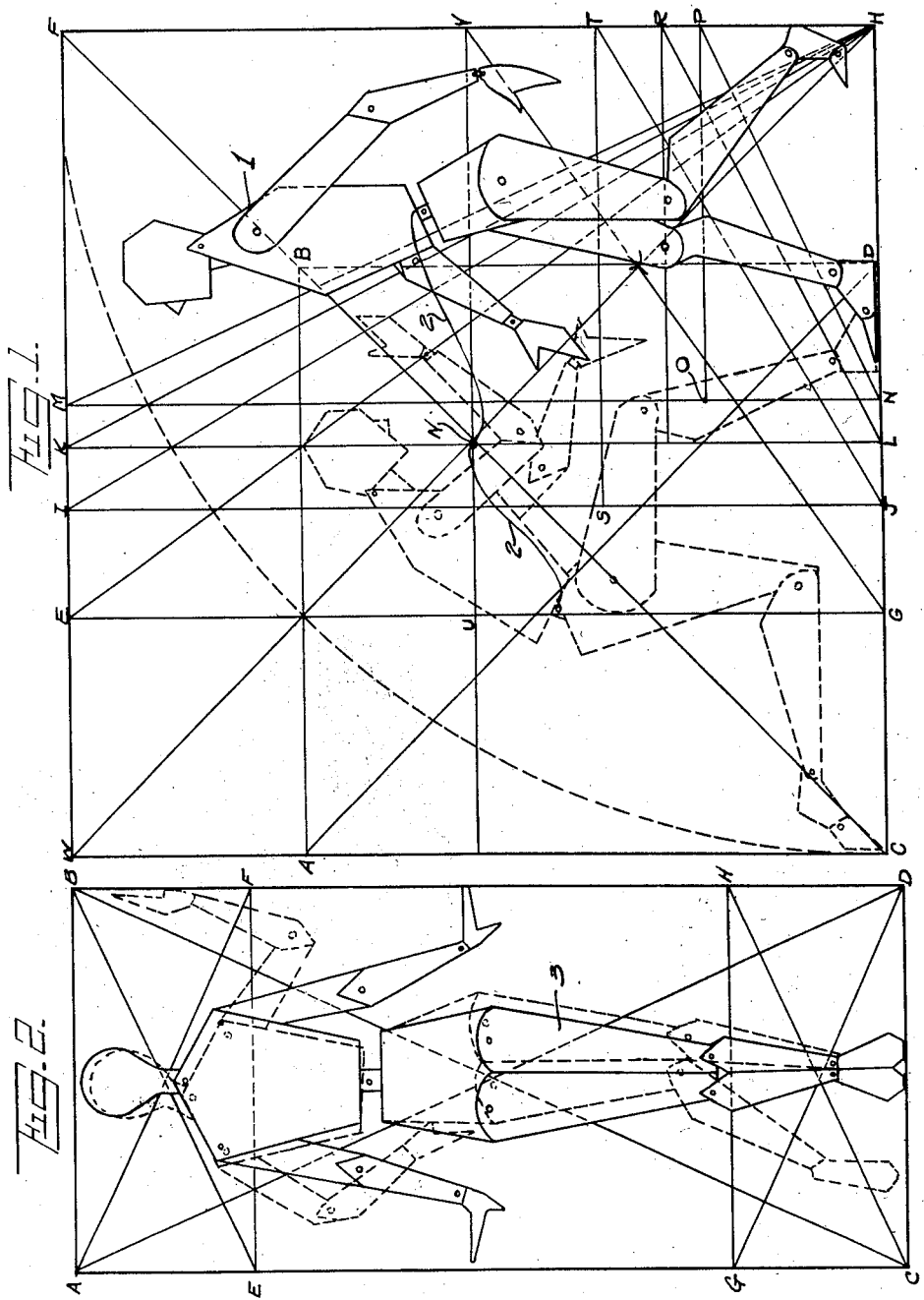
INVENTOR
*Bhima Burton*
BY *Eyre Scott & Keel*
ATTORNEYS

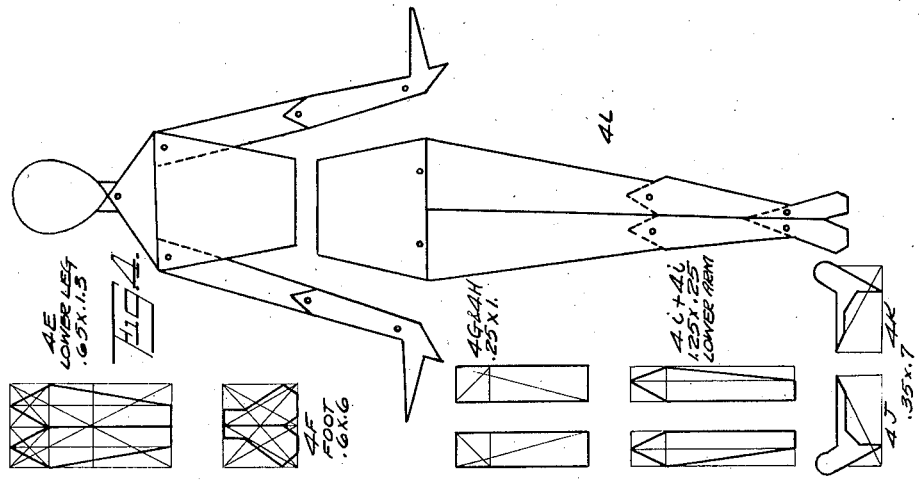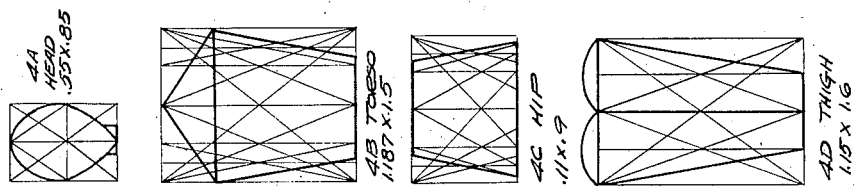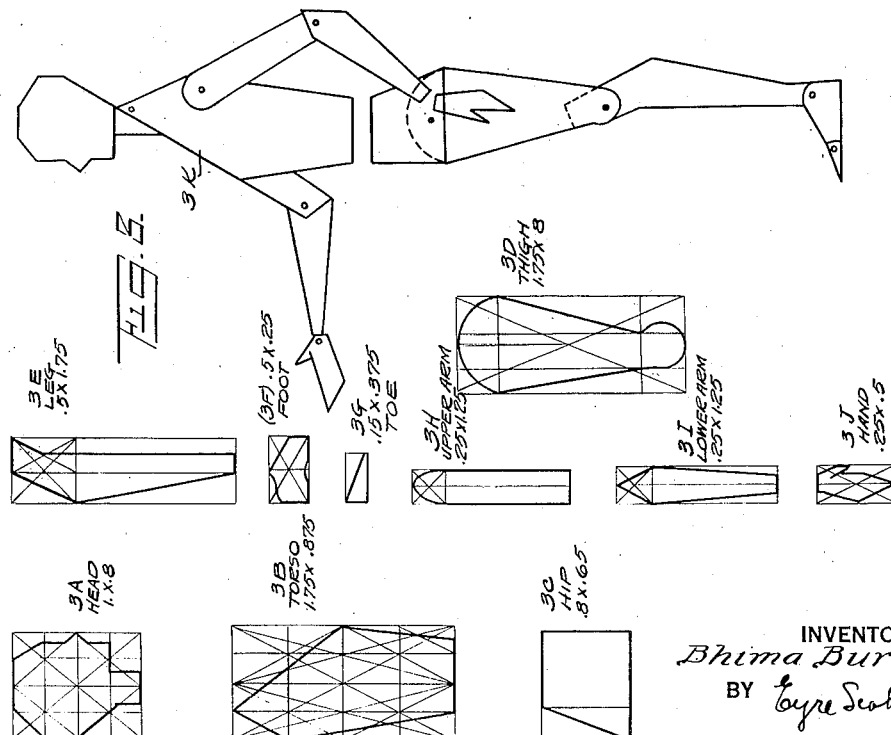

Patented Oct. 30, 1928.

1,689,422

UNITED STATES PATENT OFFICE.

BHIMA BURTON, OF NEW YORK, N. Y.

EDUCATIONAL APPLIANCE.

Application filed October 29, 1926. Serial No. 144,942.

My invention relates to appliances particularly adapted for use in educational work, art schools, illustrating, costume designing and the reproductive arts generally.

The object of the invention, generally speaking, is a model, figure or manikin constructed on the principles of dynamic symmetry and preferably associated or correlated with a diagram or diagrams of geometrical figures in a manner to demonstrate or facilitate an understanding of those principles. For example, the invention in one form includes a human figure constructed on the six fundamental lines of design in accordance with dynamic symmetry and mounted on or associated with card-boards or other means carrying correspondingly proportioned geometrical figures. This embodiment of the invention may be used to great advantage by illustrators and artists to obtain the correct proportion and symmetry in any desired action of the manikin. It may be used by costume designers and costume students, as for example by using the construction lines which are correctly and symmetrically proportioned, or for movement in illustrating costume design. It may be used by instructors of life drawing, dynamic symmetry and costume design to teach the correct construction of the human figure in design, symmetry and proportion, each part being designed in its proper dynamic rectangle; by placing the figure or manikin in any pose desired to instruct the students in action, symmetry and proportion; and to place the manikin in the desired geometrical figure to demonstrate the principles as to the lines of symmetry the diagonal of the whole major rectangle and on the diagonal of the reciprocal.

For a better understanding of the invention, reference may be had to the drawings, wherein:

Fig. 1 is a combined diagram and figure in side view,

Fig. 2 is a similar combination of a front view,

Fig. 3 is an exploded view of the parts of the human body constructed and proportioned on the principles of dynamic symmetry and illustrating the principle of construction of the figure of Fig. 1, Fig. 4 is a similar view as to the front view of the figure.

Referring to Fig. 1 I have indicated a series of geometrical figures constructed and based on the principles of dynamic symmetry. These figures may be included on a suitable card-board of paper, celluloid or other suitable material, black-board or otherwise. The following brief description of the diagram of Fig. 1 will be sufficient to those informed on the principles of dynamic symmetry: Let A B C D equal the square or unit 1; E F G H equal the root 2 rectangle ($\sqrt{2}$); F H I J the root 3 rectangle ($\sqrt{3}$); F H K L the root 4 rectangle ($\sqrt{4}$); F H M N the root 5 rectangle ($\sqrt{5}$); W K C L another root 4 rectangle ($\sqrt{4}$). Reciprocals of these rectangles are as follows: O N P H is the reciprocal of the root 5 rectangle; Q R L H is the reciprocal of the root 4 rectangle; S T J H is the reciprocal of the root 3 rectangle, and U V G H is the reciprocal of the root 2 rectangle. The model, figure or manikin is indicated at 1. This manikin is constructed on the principles indicated in Fig. 3 where sub-figures $3^a$ to $3^j$ indicate respectively the geometrical figures for constructing and proportioning the various parts of the human body according to the principles of dynamic symmetry, while $3^k$ indicates the assembly of the various parts indicated into the human figure in accordance with the principles of dynamic symmetry. In Fig. 1 with this figure or manikin thus constructed, the parts of the body are adjustably fixed to each other (for example as indicated at the points marked $o$) so as to be able to cause the figure to assume different poses and forms of action and by positioning this manikin upon the card-board or other diagram of dynamic symmetry geometrical figures, any pose or action taken or assumed by the figure will demonstrate and exhibit the correct proportions and symmetry, according to the principles above indicated. For example, the manikin or figure is placed in any desired rectangle and when confined to that rectangle it is found that it will assume an entirely symmetrical position and that all lines will be parallel to the diagonal of the rectangle or at right angles to the diagonal of the major rectangle. For example, Fig. 1 in dotted position of the manikin shows the latter falling on diagonal B C of the whole square, that is the line of the torso parallels this diagonal; and the upper arm parallels the diagonal X Y of the reciprocal of the square A B C D. If desired, the figure or manikin 1 may be permanently attached to the card-board or other means carrying the geometrical figure and I have indicated diagrammatically a thread 2 having one end fastened to the diagram of Fig. 1 at $z$ and the other end attached to the figure, this thread preferably being long enough to permit the figure 1 to be reversed from side to side and to be shifted over to different parts of the diagram.

Fig. 2 is similar to Fig. 1 except that it shows a front view of the figure or model, whereas Fig. 1 shows the profile view. Fig. 4 with its various sub-figures $4^a$—$4^j$ indicates the proper proportion and design of the different parts of the human body from the front view, according to the general principles. The remarks above in connection with Fig. 1 apply generally to Fig. 2, it being observed that the manikin 3 of Fig. 2 may be placed in any position in the root 5 rectangle A B C D and in any such position it will be in dynamic symmetry, since the manikin or figure is constructed with the dynamic symmetry organization. The full line position shows front view of manikin, no action, and positioned within the root 5 rectangle A B C D, the shoulders being parallel to the diagonals A F and B E of the reciprocal of the root 5 rectangle. The manikin is symmetrical and parallels all these diagonals as it is made on the six fundmental lines of dynamic symmetry. The dotted position indicates movement or action of the figure within the root 5 rectangle, the fore arm being parallel to the diagonal B C of the whole, and similarly all other lines of action being in accordance with these principles.

Both Figs. 1 and 2 are constructed on the six fundamental lines of dynamic symmetry,—the diagonal of the whole and the counter diagonal of the whole, the diagonal of the reciprocal and the counter diagonal of the reciprocal, the vertical and the horizontal. The line of action will follow the diagonal of the whole. The arms will follow the diagonal of the reciprocal, cutting the diagonal of the whole at right angles. The figure contained in A B C D or unity would be found to be on the line of action on the diagonal of the whole, the arms parallel with the diagonal of the reciprocal. As above indicated, each section of the manikin is designed, constructed and proportioned in accordance with the principles of dynamic symmetry and the sub-figures $3^a$ to $3^j$ of Fig. 3 indicate the designs of the parts of the human body within the root rectangles of dynamic symmetry according to the organization of dynamic symmetry. Similarly in Fig. 4 the sub-figures $4^a$ to $4^k$ indicate the outlines of the different parts of the human body as indicated within the root rectangles according to the organization of dynamic symmetry.

Having thus described my invention, what I claim and desire to protect by Letters Patent is:

1. An educational appliance consisting of a combined diagram of geometrical figures based on the fundamental principles of dynamic symmetry and a figure associated therewith and having the various parts thereof constructed, proportioned and assembled according to the fundamental principles of dynamic symmetry.

2. An educational appliance consisting of a figure designed and proportionel upon the principles of dynamic symmetry and having the various parts of the body adjustably joined together to enable the figure to assume different actions.

3. An educational appliance consisting of a figure, the principal parts of which are constructed and proportioned according to the principles of dynamic symmetry, these various parts being adjustably joined together to permit the figure to assume different poses and actions.

4. An educational appliance consisting of a diagram or print having incorporated thereon an assembled figure whose parts are constructed and proportioned upon the fundamental principles of dynamic symmetry and individual diagrams demonstrating the correct proportioning of the different parts of the assembled figure.

5. An educational appliance of the character set forth in claim 1 wherein the parts of the figure are articulated with reference to each other and the figure is adjustably attached to the diagram.

6. As an article of manufacture an educational appliance consisting of a combined diagram of geometric figures based on the fundamental principles of dynamic symmetry and including the six fundamental lines thereof and a figure adjustably associated therewith and similarly having the various parts thereof constructed, proportioned and assembled according to the fundamental principles of dynamic symmetry.

7. As an article of manufacture an educational appliance consisting of a combined diagram of geometrical figures based on the fundamental principles of dynamic symmetry and including the diagonal of the whole, the counter diagonal of the whole, the diagonal of the reciprocal, the counter diagonal of the reciprocal, the vertical and the horizontal, and a figure adjustably associated therewith and having its parts articulated with reference to each other and similarly constructed, proportioned and assembled according to the fundamental principles of dynamic symmetry, whereby upon positioning the figure within any one of the geometric figures and arranging its adjustable parts symmetrically with reference to the fundamental lines thereof the correct proportion and symmetry in any desired action may be obtained.

8. An educational appliance of the character set forth in claim 7 wherein the figure is a human form having the parts thereof constructed and designed according to the fundamental principles of dynamic symmetry.

In testimony whereof, I have signed my name to this specification.

BHIMA BURTON.